May 7, 1935.  O. B. LANE  2,000,526

COMPUTING DEVICE CONSISTING OF A MATHEMATICAL CURVE

Filed Feb. 26, 1932  3 Sheets-Sheet 1

Orley B. Lane
Inventor

May 7, 1935. O. B. LANE 2,000,526
COMPUTING DEVICE CONSISTING OF A MATHEMATICAL CURVE
Filed Feb. 26, 1932 3 Sheets-Sheet 3
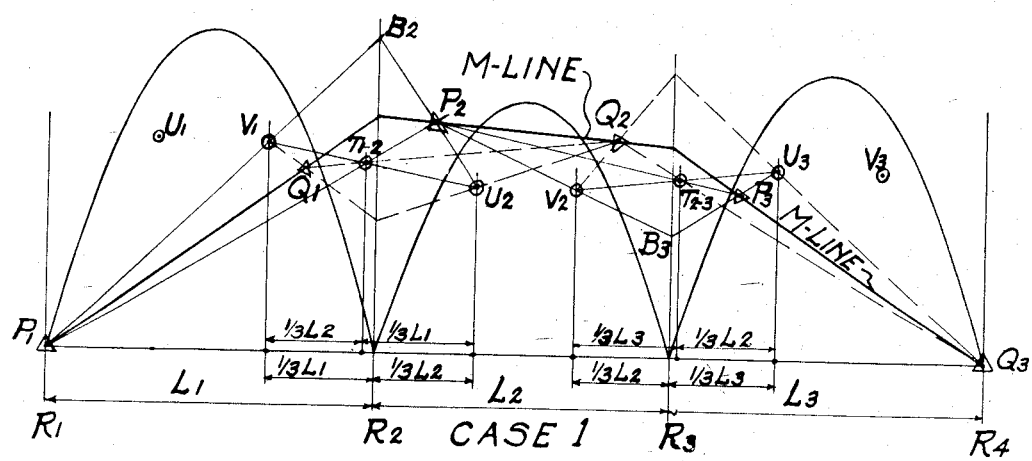
FIG 5
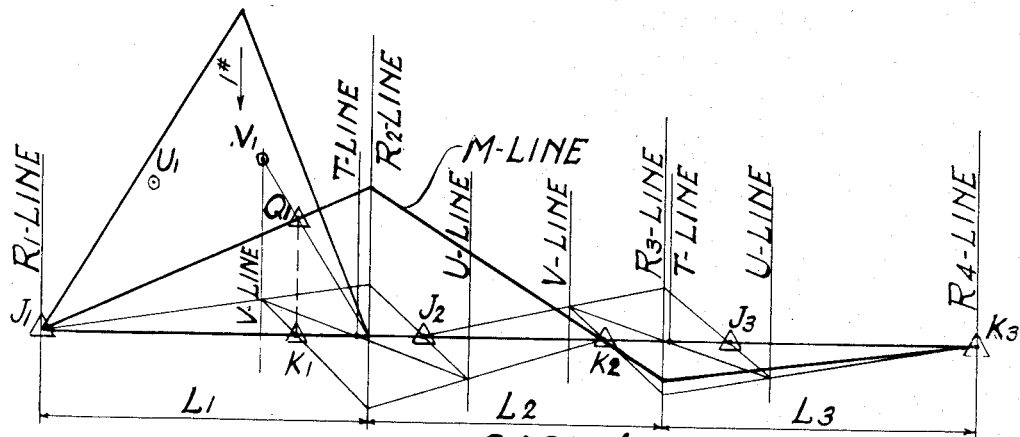
FIG. 6
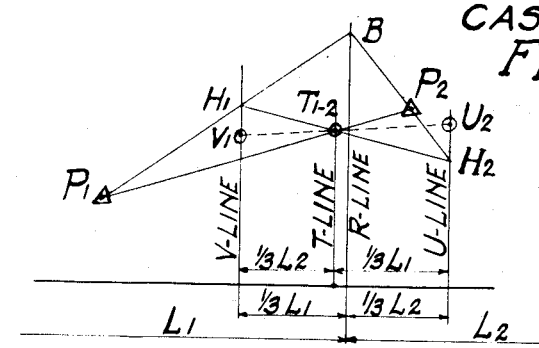
ALTERNATE CONSTRUCTION FOR "P"&"Q" POINTS
FIG 7
CASE 3
FIG. 8
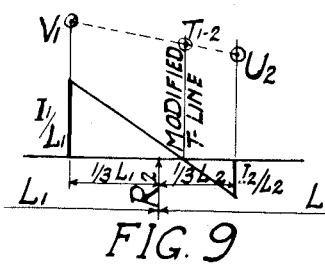
FIG. 9
Inventor
Orley B. Lane Patented May 7, 1935

2,000,526

UNITED STATES PATENT OFFICE 2,000,526

COMPUTING DEVICE CONSISTING OF A MATHEMATICAL CURVE

Orley B. Lane, Washington, D. C.

Application February 26, 1932, Serial No. 595,377

11 Claims. (Cl. 33—1)

My invention relates to a device for plotting the set-up necessary for the solution by a graphic method of bending moments in a system of restrained and continuous beams.

The object of my invention is first, to provide curves so constructed that the bending moment of a simple beam loaded with a uniform load can be determined readily with no computations other than a simple ratio of a unit load to the actual load; second, providing means of locating certain working points on these curves to be used in the graphic solution of restrained and continuous beams; third, arranging the series of curves so that a system of continuous beams carrying different uniform loads on different spans may be readily plotted and the resulting diagram may be scaled to one scale and the resulting moment determined by simple ratio; fourth, provision of curves for a concentrated load at different points on a span together with working points necessary for the set-up for drawing a moment closing line for the concentrated load by a graphic method.

I make no claim to the graphic method of the solution. There are several graphic methods available for this solution. I prefer "the method of conjugate points" as described in the paper by L. H. Nishkian and D. B. Stienman published in the transactions of the American Society of Civil Engineers, vol. 90, June 1927. In these solutions it is necessary to plot simple beam moment diagrams and certain working points which is familiar to those engaged in the art. This series of curves will provide means of readily plotting the simple moment diagrams and the working points for a unit load from which a moment closing line can be drawn and the moments for any load can be obtained from this diagram by scaling and using a simple ratio. This will eliminate a great amount of labor which has heretofore worked to the detriment of graphic solutions.

I attain these objects by the curves shown on the accompanying drawings which are made of some transparent material such as celluloid.

In the accompanying drawings:

Figure 5 shows the application of curves of the form shown in Figures 1 and 2 to the solution of a problem of a beam having a continuous load.

Figure 6 shows the application of triangles of the form shown in Figures 3 and 4 to the solution of a problem of a beam having concentrated loads.

Figures 7, 8 and 9 are diagrams explanatory of the method of determination of certain significant points incident to the solution of the problems involved.

Figure 1:
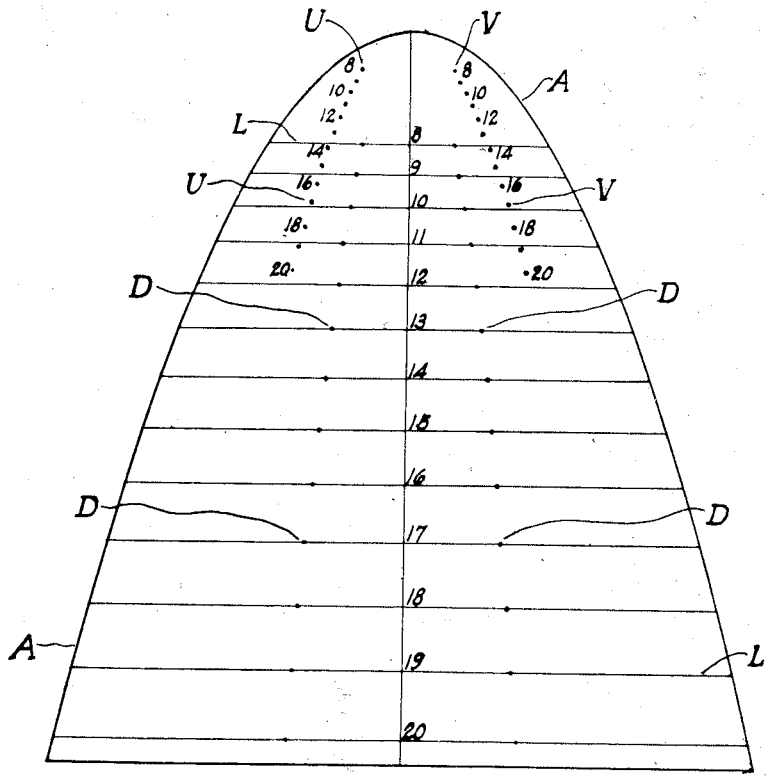
Figures 1 and 2 show two forms of curves embodying my invention.

Fig. I represents curve I in which the curve "A" is a parabola whose ordinates represent the bending moment in a beam carrying a uniform load; the ordinates satisfying the bending moment equation:

$$M=\frac{WX}{2}(L-X),$$

in which M is equal to the bending moment at point X which is the ordinate of the parabola at point X; L is equal to the span; W equals load per unit of length; X is equal to any distance measured from the support.

For a given load W, the parabolas for various spans are similar. Therefore, if the maximum ordinate for a given span is measured down from the apex of the parabola and the span laid off as a chord, the ends of the span will lie on the locus of the curve. In constructing this curve, I have assumed a dummy unit load. The lines "L" representing the spans are laid off to scale and numbered to designate the length in feet of spans they represent. The ordinates are laid off for the moments for a unit load to a unit decimal scale.

Thus if $W=1\#/\text{ft.}$; 1″ on the vertical scale=10 ft. lbs. of moment;

$W=10\#/\text{ft.}$; 1″ on the vertical scale=100 ft. lbs. of moment;

$W=100\#/\text{ft.}$; 1″ on the vertical scale=1000 ft. lbs. of moment;

Thus if a beam carried 4,750 # per foot, the vertical scale would be 47,500′# per inch on the vertical scale of the parabola. Since the ordinates vary directly with the load, this curve, to some scale, will satisfy any uniform load. A horizontal scale of 1″=4′—0″ gives a well proportioned parabola. While I have mentioned these scales as an illustration, I do not care to limit myself to these proportions.

The holes "D" are at the ⅓ points of the various spans and are holes in the sheet large enough to accommodate a pencil point. The points "U" and "V" are points directly above the "D" points for their respective spans and so placed that their ordinates are ⅔ the maximum ordinate for their respective spans, or equal to the area of the curve divided by the span. These points are numbered to designate the spans to which they correspond. At these points there are holes large enough to accommodate a pencil point.

In plotting the graph of a simple beam loaded with a uniform load with this curve, the base line is drawn with a straight edge. The line "L" on the curve corresponding to the span of the beam, is placed over the base line and the graph is produced by tracing around the curve above the respective base lines. The bending moment at any point on the beam can then be determined by scaling the ordinate to the curve at that point and using a ratio as indicated above. If it is desired to make a diagram of continuous beams, the working points "U", "V", and "D" used in the set-up for a graphic solution may be plotted. Interchanging the ⅓ span segments of adjacent spans is accomplished by placing the edge of the curve on the "D" point plotted in the adjacent span and plotting the point through the hole "D" for the span just plotted, thus giving another working point to be used in the graphic solution. The graph of a beam carrying a load beginning at one end of the span uniformally distributed over part of the span only, may be plotted by placing the center line of the curve at the point of zero shear on the span, and the edge of the curve at the loaded end of the span and tracing around the curve to an intersection with a vertical erected at the end of the load, and drawing a straight line from this point of intersection to the unloaded end of the span.

Figure 2:
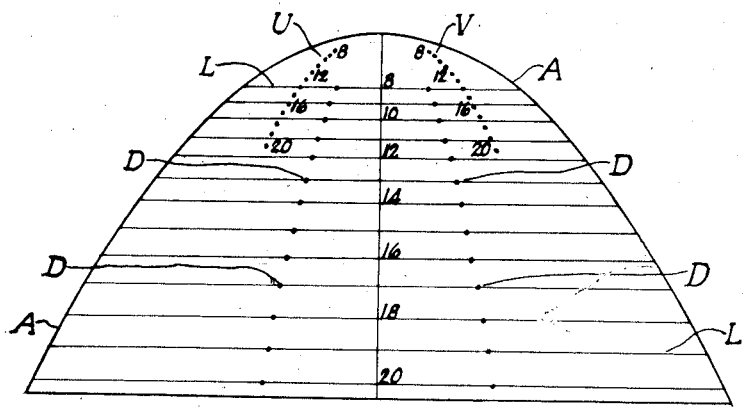

Fig. 2 represents curve 2 which is similar to curve I with the exception that the vertical scale, or the scale of the ordinates, is ½ that of curve I, while the horizontal scale, or scale of the chords, is the same as in curve I. Thus it represents to the scale of curve I, beams loaded with ½ the load carried by beams represented by curve I. That is to say, that in the equation noted above, $W=1$ for curve I and $W=.5$ for curve 2 to the same scale. While I have shown only these two curves in the accompanying drawings, the series is intended to be composed of curves varying consecutively by a ratio of 0.1 from $W=.3$ to $W=1.5$ inclusive or at such other intervals as may be desired. With this series of curves it will be possible to plot simple moment curves for a series of beams carrying different uniform loads on different spans by using curves of the same ratio of W as the ratio of loads, and to plot the working points necessary for determining the moment closing line for the system. While it is of course true that these curves will not fit every load, the intervals can be made close enough so that the moments thus found will be within the limits of accuracy usually required for structural work. If the curve $W=1$ is used for one of the loads in a series of beams, the scale of the diagram will be a ratio of that load to a unit.

Figure 3:
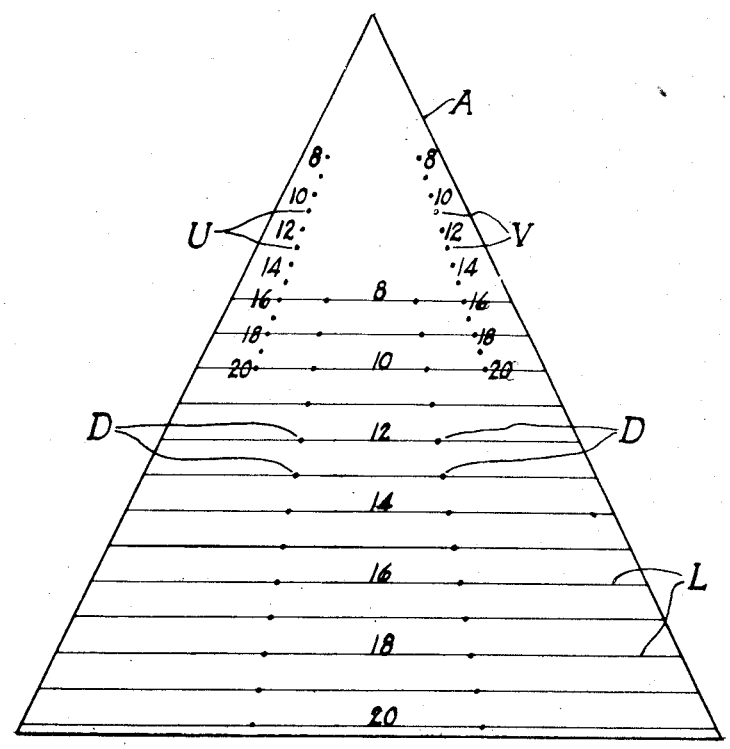
Figures 3 and 4 show two forms of triangles embodying my invention.

Fig. 3 is a triangle and it represents the moment curve for a concentrated load at the center of the span. The curve is for a unit load. The triangles for the various spans will therefore be similar and if the maximum ordinate is measured down from the apex of the triangle and the spans laid off as the base of the triangle, the ends of the spans will lie on the curve. The lines "L" and the points "U", "V", and "D" have the same significance as for Fig. 1. The ordinate to the "U" and "V" points is equal to the area of the curve divided by the span which is equal to ½ the maximum ordinate.

Figure 4:
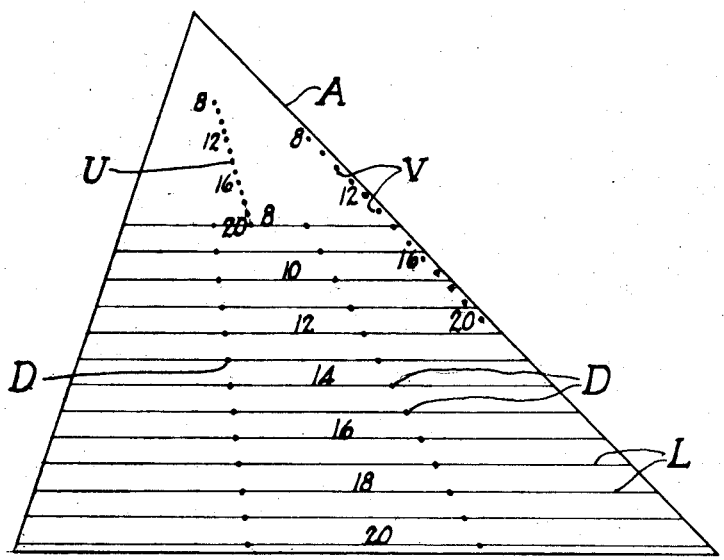

Fig. 4 is a triangle which represents the moment curve for a concentrated load of unity at the ¼ point of the spans. This curve is similar to that in Fig. 3 with the following differences. The apex of the triangle is directly above the ¼ points of the spans hence the gravity axis of the curve is not at the center of the spans. For this reason the heights or ordinates of the "U" points and "V" points are not equal. These points are above the "D" or ⅓ points of their respective spans and numbered to designate their respective spans. The mean height or ordinate of the "U" and "V" points above their respective span is equal to the area of the curve divided by the span which is equal to ½ the maximum ordinate. Also the ordinate of the "V" point, is to the mean ordinate, as the distance to the gravity axis of the curve measured from the opposite (right) end of the span, is to ½ the span; and the ordinate of the "U" point, is to the mean ordinate, as the distance from the gravity axis to the opposite (left) end of the span, is to ½ the span. If a point is located above the center of the span at the mean height of the "U" and "V" point, (equal area of curve divided by span,) a line through this point from the right end of the span will intersect the gravity axis at the height of the "U" point, and a line through this point from the left end of the span, will inersect the gravity axis at the height of the V point. It is intended that this series of curves include similar curves for a concentrated load of unity at the 0.1; 0.2; 0.25; 0.3; 0.33; 0.4 and 0.5 points of the span and at such other intermediate points as the structural work may require. These will readily give the set-up for drawing the continuous moment closing line for a concentrated load at any of these points by a graphical method, and thus furnishing a means of drawing an influence line. The curves can be reversed and used for corresponding points of the opposite side of the ½ point of the span. With this series of curves it will be possible to plot the moments for loads commonly occuring in practice. A condensed description of the solution of continuous beams by the "Method of Conjugate Points" (by Nishkian and Steinman) with the use of the curves hereinbefore described follows. This description is illustrated by figures on sheet 3 of the drawings. The proposition is to solve a system of continuous beams by constructing a moment diagram for a unit load and multiplying the unit load moments by the actual load.

*Case 1: Varying span lengths—constant uniform load*

A. Lay off spans $L_1$; $L_2$; $L_3$ to the horizontal scale of the curves being used and erect verticals at the reactions $R_1$; $R_2$; $R_3$; $R_4$.

B. Use parabola marked $w=1\#/ft$. For each span, place parabola so that proper span line coincides with span on paper. Trace around edge of curve the simple beam moment graph. Plot third points thru holes on span line. Plot U and V points thru numbered holes corresponding to span.

C. Locate T-line between each pair of spans by laying off ⅓ of longer span from the third point of shorter span, using holes on span lines of curve.

D. Erect T-line verticals. Draw $V_1$—$U_2$; this intersects T-line at point $T_{1-2}$. Draw $V_2$—$U_3$; this intersects T-line at point $T_{2-3}$. This completes set-up for diagram for a three span beam. Any number of spans can be solved similarly.

E. Locate M-line or true datum line thus: For freely supported ends the M-line must pass thru the extreme left and right supports, this locates $P_1$ and $Q_3$ in the case shown. A line from $P_1$ thru $V_1$ locates $B_2$ on $R_2$-line. Draw $B_2$—$U_2$. A line from $P_1$ thru $T_{1-2}$ intersects $B_2$—$U_2$ at $P_2$. A line from $P_2$ thru $V_2$ locates $B_3$ on $R_3$-line. Draw $B_3$—$U_3$. A line from $P_2$ thru $T_{2-3}$ intersects $B_3$—$U_3$ at $P_3$. An alternate construction for the location of the P points is shown on drawing Number 2. The Q points are located in similar manner by starting at the extreme right support and working towards the left (see dotted lines Case 1, drawing No. 2). Draw $P_1$—$Q_1$, $P_2$—$Q_2$, $P_3$—$Q_3$=M-line. Common intersections on R-line checks correctness. Or, starting at $Q_3$ draw thru $P_3$ to $R_3$-line, from here thru $P_2$ to $R_2$-line, from here to $P_1$=M-line. This eliminates the construction for the Q points but does not give a check. The diagram is for a 1#/ft. load. Scale moments from M-line to simple beam moment graph at the vertical scale of curve used. Multiply unit load moments by actual load.

Case 2: Varying span lengths—varying uniform loads

Thus 1#/ft.=W for one span; =W' for next; =W'' for next. Let W=largest load; then W'=C'W and W''=C''W. Plot span carrying W with parabola marked 1#/ft. Plot spans carrying W' and W'' with parabolas marked to correspond with C' and C''. Locate M-line in the same manner as Case 1. Scale moments at the vertical scale of curve used. Multiply scaled moments by W.

Case 3: Partially distributed uniform load beginning at one end of span

A. Lay off span. Erect verticals at center line and 1/3 points of span, at the end of load, at point of zero shear, and at the gravity axis of the graph. Place center line parabola in register with zero shear line so that edge of parabola touches reaction at loaded end; trace around parabola to vertical at end of load; draw straight line to end of span. Locate "O" point on center line at a height equal to the area of the curve divided by the span. Lines from "O" to the ends of the span intersect the g-line at the height of the U & V points (Fig. 8,). Where span has two intensities of uniform load, separate them so that the smaller forms a fully distributed load and the remainder of the larger forms a partial uniform load. Diagram smaller load with other spans having fully distributed loads and then locate a separate M-line for the partial load, considering other spans unloaded. Add ordinates of these M-lines algebraically at R-lines for true M-line. Also add simple beam moment graphs.

B. To locate a separate M-line for an isolated load, draw a line from its U-point to left end of span and from its V-point to right end. The intersection of these lines with projections from the P & Q points for full loading locates P' & Q' for isolated load. The projection of the P & Q points in the other spans locates the J & K ("fixed") points on the base line. The separate M-line passes thru P'—Q' and thru the far fixed points of the unloaded spans. Construction for location of J & K ("fixed") points given on Fig. 6. P points are on projections of J points and Q points are on projection of K points, irrespective of loading.

Case 4: Concentrated loads

Consider each concentration as an isolated load. Use triangles to plot simple moment graph and working points in the same manner as described for parabolas. Triangles are for 1# load. Locate separate M-line for each load (see case 3—B). Determine actual moments for each load by scaling the unit load moments to the scale of the curves used and multiplying by the actual loads. Add actual moment for concentrated load to actual moments for uniform load or other concentrated loads. Influence lines for moving loads can be determined by plotting concentrated loads at successive points of the span.

Case 5: Unequal I. In preceding cases a constant I was assumed

The position of the T-line is altered for unequal moments of inertia. See diagram, Fig. No. 9, for modifying construction.

For alternate construction to locate P and Q points see pennant diagram $P_1$ $H_1$ B $H_2$ (Fig. 7, drawing No. 2). Consider $P_1$—B the staff; $H_1$—$H_2$ the base and B—$H_2$ the external of the pennant. Pennant starts at $P_1$, has its apices on the reaction and 1/3 lines and its base passes thru the T-point. The externals of all such pennants will intersect at $P_2$. The line $P_1$—$T_{1-2}$—$P_2$ is such a pennant reduced to a straight line.

The above is intended to give the essential data necessary to solve graphically continuous beams with the span and loading conditions noted. These are the conditions most frequently occuring in practice. The proof and detailed description of the constructions given above and also further applications of the "Method of Conjugate Points" is given in the article referred to above. It is recommended for the perusal of the student of continuous beams.

What I claim is:

1. A plotting device consisting of a sheet of material having an outline formed as a moment curve having spaced parallel base lines representing different lengths of span to scale, said base lines being so placed that the ordinates from each respective base line to the outline of the curve represent the bending moment at the respective ordinates of the respective span to scale for a predetermined type and amount of load.

2. A plotting device consisting of a sheet of material having an outline formed as a moment curve having spaced parallel base lines representing different lengths of spans to scale, said base lines so placed that the ordinates from each respective base line to the outline of the curve represent the bending moment at the respective ordinates of the respective span to scale for a predetermined type and amount of load with apertures at the one-third points of the spans designated thereon.

3. A plotting device consisting of a sheet of material having an outline formed as a moment curve having spaced parallel base lines representing different lengths of span to scale said base lines so placed that the ordinantes from each respective base line to the outline of the curve represent the bending moment at the respective ordinates of the respective span to scale for a predetermined type and amount of load with apertures at the one-third points of the spans designated on said base lines and with points located vertically above said one-third points at a mean height equal to the area of the curve above the respective base lines divided by the span.

4. A plotting device consisting of a sheet of material having an outline formed as a parabolic curve for plotting bending moment diagrams said sheet having parallel chords drawn thereon representing different lengths of span to scale each of said chords being so placed with respect to the outline of said curve that the ordinates between respective chords and the curve represent to a predetermined scale the bending moments at the respective ordinates of the spans represented by said chords for a predetermined uniform loading.

5. A plotting device consisting of a sheet of material having an outline formed as a parabolic curve for plotting bending moment diagrams said sheet having parallel chords drawn thereon representing different lengths of span to scale, said chords having the one-third points of said spans represented thereon.

6. A plotting device consisting of a sheet of material having an outline formed as a parabolic curve for plotting bending moment diagrams, said sheet having parallel chords drawn thereon representing different lengths of span to scale, said chords having the one-third points of said spans represented thereon, said sheet having points represented thereon above each of said one-third points at a height equal to the area of the curve above each respective chord divided by the span, that is, equal to two-thirds the maximum height of the curve above each respective chord.

7. A plotting device consisting of a sheet of material having an outline formed as a parabolic curve for plotting bending moment diagrams, said sheet having parallel chords drawn thereon representing different lengths of span to scale, said chords having the one-third points of said spans represented thereon, said sheet having points represented thereon above each of said one-third points at a height equal to the area of the curve above each respective chord divided by the span, that is, equal to two-thirds the maximum height of the curve above each respective chord said sheet having a line thereon normal to the chords at the center of the parabola.

8. A combination of plotting devices consisting of sheets of material having outlines formed as parabolic curves for plotting diagrams, representing bending moments of beams each curve having parallel chords drawn thereon representing different lengths of span of said beams to scale, said chords having the one-third points of said spans represented thereon, said curves each having U and V points represented thereon respectively above said one-third points at a height equal to the area of the curve above each respective chord divided by the span, the ordinates between each chord and the outline of said curve on each sheet representing to scale the bending moments at the respective ordinates of a beam uniformly loaded with a predetermined load, and having a span corresponding in length to said chord, said sheets being constructed and designed for juxtapositioning in a series to represent the bending moments of separate beams carrying predetermined loads and forming consecutive spans, whereby the said U and V points of the juxtaposed sheets are relatively positioned to aid in the construction of the moment closing line of a single continuous beam carrying loads corresponding to said predetermined loads and extending over said consecutive spans.

9. A plotting device consisting of a sheet of material having an outline formed as a triangle, for plotting bending moment diagrams with parallel base lines thereon representing different lengths of span to scale, said base lines having the one-third points of said spans represented thereon, said sheet having points represented thereon above said one-third points at a height equal to the area of the triangle above each respective base line divided by the span, the ordinates between respective base lines and the outline of the triangle representing to scale the moments at the respective ordinates of a beam loaded with a concentrated load of unity at the center.

10. A plotting device consisting of a sheet of material having an outline formed as a triangle for plotting bending moment diagrams said sheet having parallel base lines thereon representing different lengths of span to scale, said base lines having the one-third points of said spans represented thereon, said sheet having points represented thereon above said one-third points of each represented span at a mean height equal to the area of the triangle above each respective base line divided by the span, the height of the one of these said points above the left-one-third point of the span being in the proportion to the mean height of the two said points as the distance from the right end of the span to the gravity axis of the triangle is to one-half the span, the height of the other of these said points above the right one-third point of span being in the proportion to the mean height of said points as the distance from the left end of the span to the gravity axis of the triangle is to one-half the span, the ordinates between respective base lines and the outline of said triangle representing to scale the bending moment at the ordinate of a concentrated load at some point of the span other than the center.

11. A combination of plotting devices consisting of sheets of material having outlines formed as triangles for plotting diagrams representing bending moments of beams, each sheet having parallel base lines thereon representing different lengths of span of said beams to scale, said base lines having the one-third points of said spans represented thereon, said sheets each having U and V points represented thereon respectively above the said one-third points of each represented span at a mean height equal to the area of the triangle above each respective base line divided by the span, the height of the one of these said points above the left one-third point of the span being in the proportion to the mean height of the two said points as the distance from the right end of the span to the gravity axis of the triangle, is to one-half the span, the height of the other of these said points above the right one-third point of span being in the proportion to the mean height of said points as the distance from the left end of the span to the gravity axis of the triangle is to one-half the span, the ordinates between each base line and the outline of said triangle representing to scale the bending moment at the respective ordinate of a concentrated load at some point of the span corresponding to the length of the base line, one of these above described triangles representing the bending moments of a concentrated load of unity at the center of the span, and the others representing the bending moments of a concentrated load of unity at fractions of the span at close and convenient intervals from zero to one-half the span, said sheets being constructed and designed for juxtapositioning in a series to represent the bending moments of separate beams carrying predetermined loads and forming consecutive spans, whereby the said U and V points of the juxtaposed sheets are relatively positioned to aid in the construction of the moment closing line of a single continuous beam carrying the same loads and extending over said consecutive spans.

ORLEY B. LANE.